ವ2,719,551

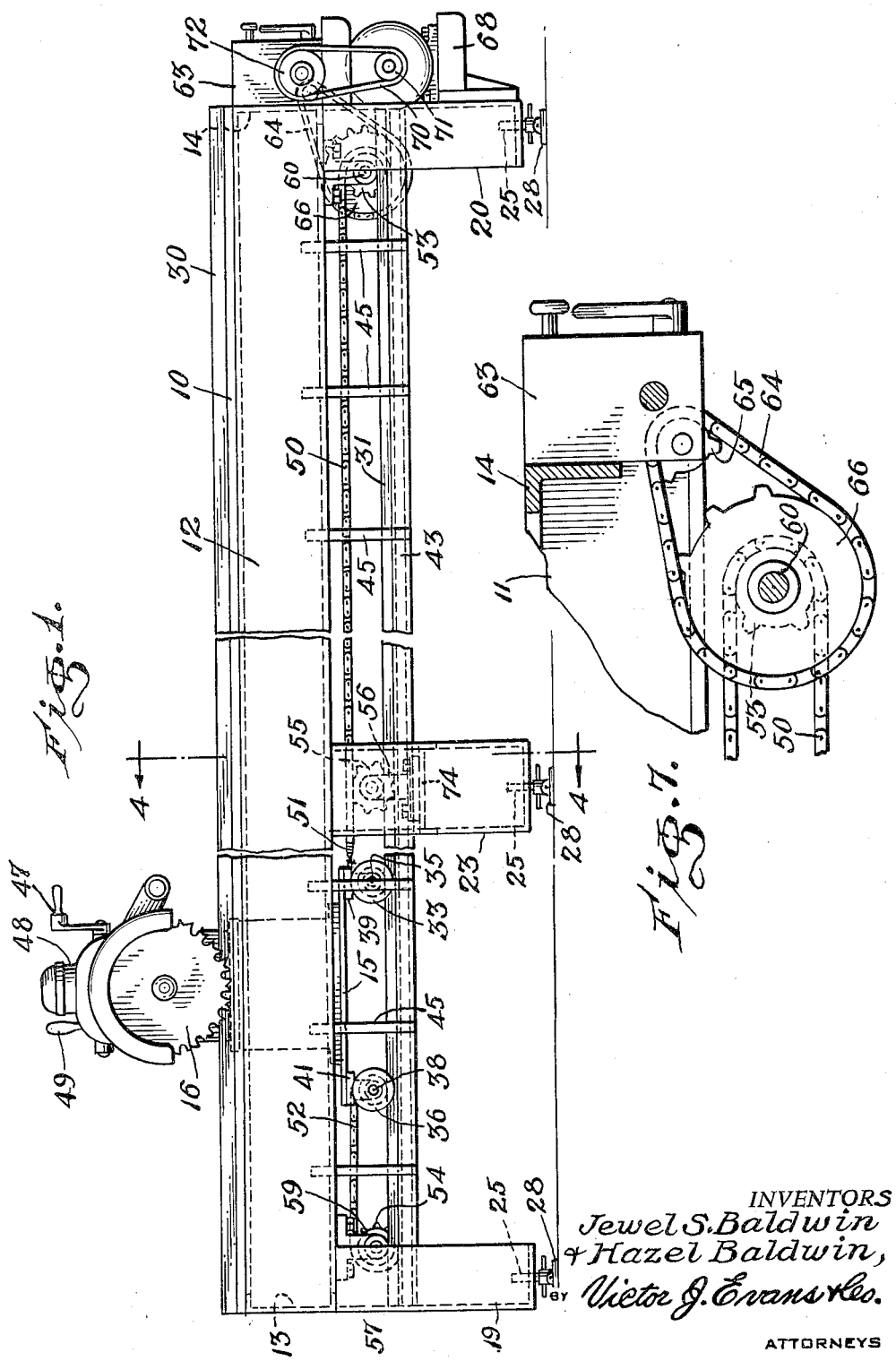

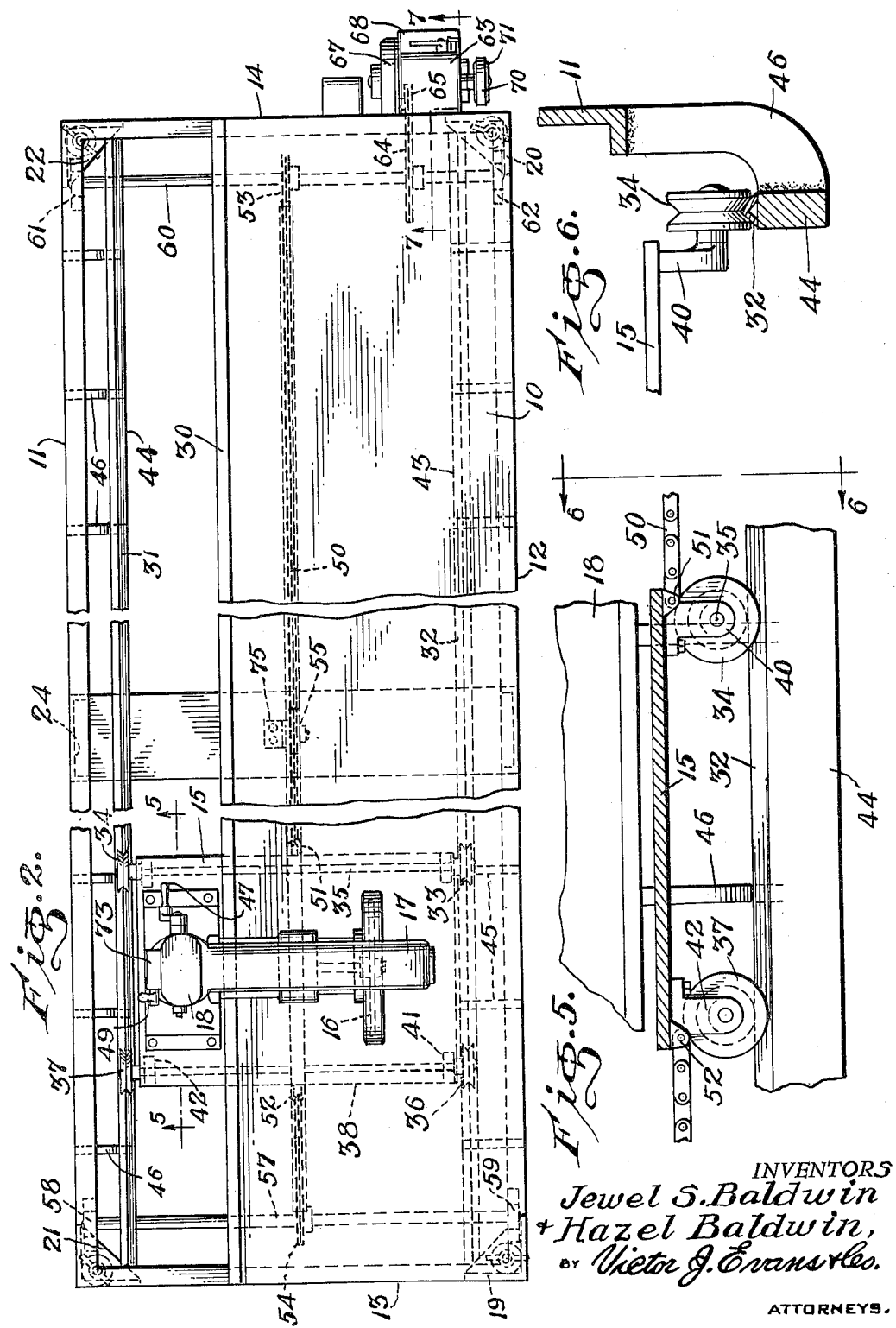

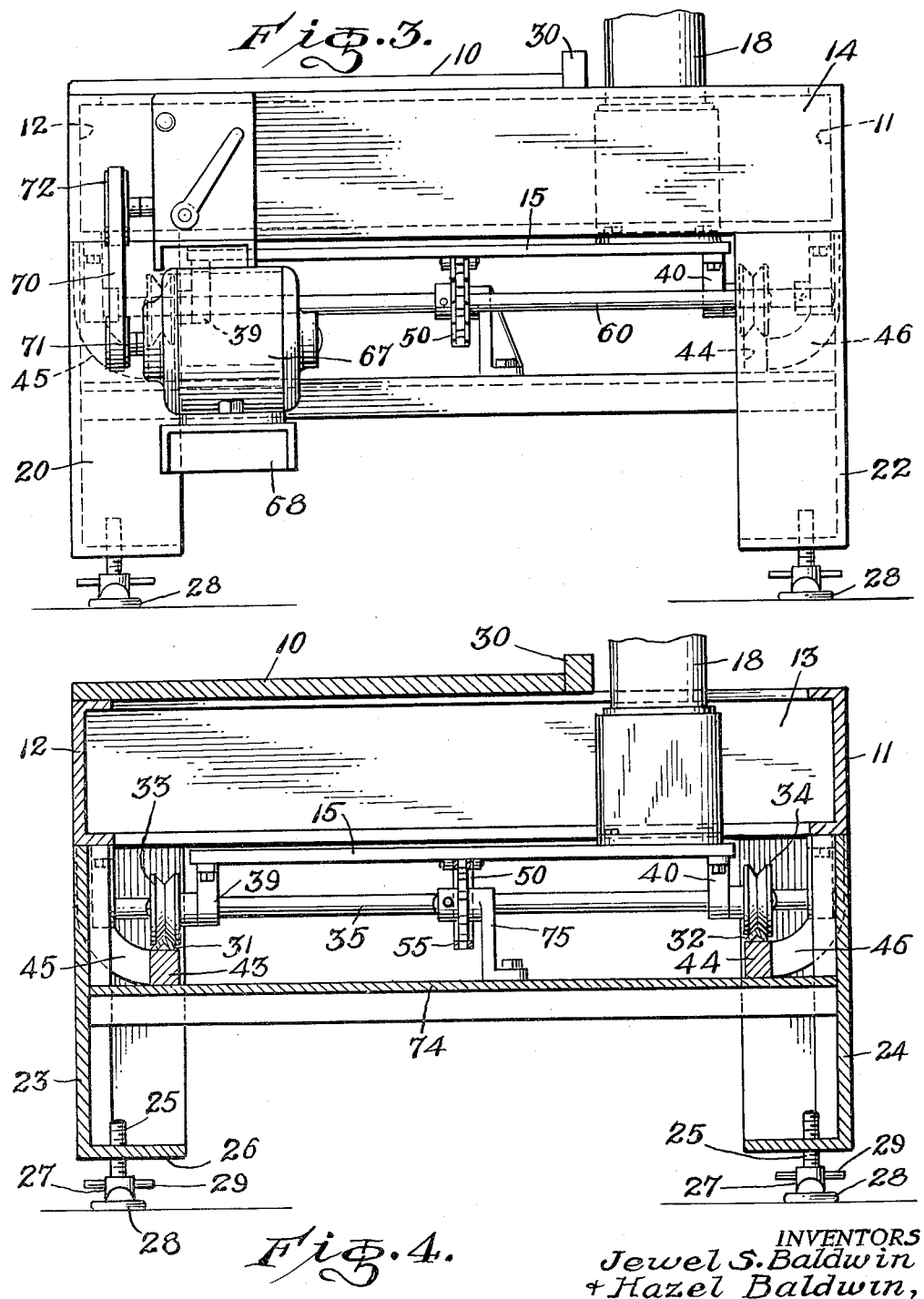

TRAVELING TABLE SAW

Jewell S. Baldwin and Hazel Baldwin, Lexington, Mo.

Application July 16, 1953, Serial No. 368,303

1 Claim. (Cl. 143—47)

This invention relates to lumber cutting saws of the type generally referred to as table saws, and in particular a table saw having an elongated table and a radial arm saw mounted on a carriage whereby the saw is adapted to travel longitudinally of the table and is also adapted to cut at different angles, being mounted to be adjusted to different positions in relation to the saw table.

The purpose of this invention is to provide a universal saw that is adapted to rip comparatively long pieces of lumber into strips and that is also adapted to cut at different angles such as is required in forming roof rafters.

With the conventional type of table saw the bed or table is comparatively short and it is difficult to hold long pieces of lumber such as floor and ceiling joists and roof rafters and where saws are provided to travel longitudinally of a table or frame it is difficult to swing the saws to make cuts at different angles. With this thought in mind, this invention contemplates a table saw in which the saw is suspended from above, such as a radial arm saw and in which the saw is mounted on a traveling carriage whereby the saw is adapted to cut throughout the length of the table.

The object of this invention is, therefore, to provide means for mounting a radial arm saw above a table, bench, or frame whereby the saw is adapted to travel longitudinally of the table.

Another object of the invention is to provide means for mounting a radial arm saw on a saw table in which means is provided for swinging the saw to cut at different angles.

A further object of the invention is to provide a traveling saw in combination with an elongated saw table in which the device is of a comparatively simple and economical construction.

With these and other objects and advantages in view the invention embodies an elongated table having a longitudinally disposed slot or opening in one side with a radial arm saw mounted on a carriage positioned to travel on a track below the surface of the table and means for operating the saw and carriage.

Other features and advantages of the invention will appear from the following description taken in connection with the drawings, wherein:

Figure 1 is a front elevational view of the improved mounting for a radial arm saw.

Figure 2 is a plan view of the improved saw with parts broken away, the length of the table being adapted to be formed to compensate for materials of different lengths.

Figure 3 is an end elevational view of the improved saw table looking toward the end upon which the carriage actuating motor is positioned.

Figure 4 is a cross section through the improved saw table taken on line 4—4 of Figure 1, the parts being shown on an enlarged scale.

Figure 5 (Sheet 2) is a detail showing a section through the carriage upon which the saw is mounted, said section being taken on line 5—5 of Figure 2 and showing the parts on an enlarged scale.

Figure 6 is a detail showing a section taken on line 6—6 of Figure 5, showing the wheels of the carriage, one of the tracks and one of the track hangers whereby the track of the saw carriage is suspended from the table frame.

Figure 7 (Sheet 1) is a detail also with the parts shown on an enlarged scale showing the driving connection between the carriage actuating chain and reduction gear housing.

Referring now to the drawings wherein like reference characters denote corresponding parts the improved traveling table saw of this invention includes a table top 10 mounted on a frame having side beams 11 and 12, end beams 13 and 14, a traveling carriage 15 and a saw 16 carried by an arm 17 and mounted on the carriage through a post 18.

As illustrated in Figures 1 and 2 the table is supported with corner legs 19 and 20 at the front and 21 and 22 at the rear and intermediate legs, with a leg 23 at the front and a similar leg 24, at the rear.

The lower ends of the legs are provided with adjusting screws 25 which are threaded in webs 26 (Figure 4) and which are journaled in heads 27 on base plates 28. The heads of the screws are provided with arms 29 by which the screws may be rotated to adjust the elevation of the different points of the table whereby the table top 10 is adapted to be adjusted to a level position.

The table top 10 is mounted on upper flanges of the side beam 12 and end beams 13 and 14 and the inner edge of the top is provided with an inner rail 30.

The carriage 15 is mounted to travel on V-shaped rails 31 and 32 with wheels 33 and 34 on a shaft 35 and wheels 36 and 37 on a shaft 38 at the opposite end of the carriage.

The shaft 35 is journaled on the carriage with bearings 39 and 40, as shown in Figure 4, and the shaft 38 is journaled in similar bearings, as indicated by the numerals 41 and 42.

The rails 31 and 32 are carried by stringers 43 and 44, respectively, the stringers being suspended from the side beams 11 and 12 with arms or hangers 45 and 46, as shown in Figure 6.

It will be understood that a radial arm saw of any suitable type or design may be mounted on the carriage and, in the design shown the saw, as indicated by the numeral 16, is adapted to be actuated transversely across the table top with a crank 47 and the angle of the saw in relation to the table top is adjustable in the post 18 by a clamp 48 that is adapted to be actuated by a lever 49. It will also be understood that the elevation of the saw in relation to the table top is adjustable by conventional means.

The carriage 15 is moved longitudinally of the table by a chain 50, one end of which is attached to an eye 51 at one end of the carriage and the other to an eye 52 at the opposite end. The chain is positioned to travel over sprockets 53 and 54 at the ends of the table and idler sprockets 55 in bearings 56 may also be provided at points intermediate of the ends.

The sprocket 54 is mounted on a transversely disposed shaft 57 which is journaled in bearings 58 and 59 depending from the side beams 11 and 12.

The sprocket 53 at the opposite end of the table is mounted on a transversely disposed shaft 60 that is journaled in bearings 61 and 62 and the shaft 60 is rotated from a reduction gear housing 63 with a chain 64 trained over a sprocket 65 (Figure 7) on the gear housing and also over a sprocket 66 on the shaft 60. The gear reduction 63 is rotated by a motor 67 on a support 68, the motor being connected to the reduction gear with a belt 70 which is trained over pulleys 71 and 72. Although it is preferred to control the motor from a switch box 73 (Figure 2) on the post of the radial arm saw it will be understood that the motor may be controlled by suitable means and from any convenient point.

The table is provided with an intermediate platform 74 that is suspended from the stringers 43 and 44 and intermediate bearings 75, for supporting the transversely disposed shafts 57 and 60 and also the sprocket 55, may be provided thereon.

With a radial arm saw, of conventional design mounted on a carriage, such as the carriage 15 and adapted to travel longitudinally of a table, as shown and described, the saw may be made to cut a beam or piece of lumber positioned longitudinally on the table top at one point after another to provide strips or boards and, with the saw set at an angle beams such as roof rafters may be notched and cut and the angles to which the ends or notches of the beams are cut may be adjusted to compensate for the angle of the roof, as desired.

It is only necessary to set the saw to the correct angle or position and, with the work or lumber clamped to the table the motor may be started and the saw will make the cut. Furthermore, by this means, a plurality of rafters or other wood or metal beams may be cut to exactly the same angle and size.

The saw is also adapted for cutting sandstone or building veneer and other materials.

It will be understood that modifications, within the scope of the appended claims, may be made in the design and arrangement of parts without departing from the spirit of the invention.

What is claimed is:

In a saw, the combination which comprises an elongated table, having channel shaped side beams and end beams provided with upper and lower right angularly extending flanges, legs secured to the lower flanges of said side and end beams, adjusting screws mounted in the lower ends of said legs, a top plate mounted on the upper flanges of one side and both end beams and provided with an inner edge spaced from the other side beam and thereby leaving a longitudinally disposed slot in the table top, an inner rail positioned on the inner edge of said top plate and defining one longitudinal edge of the slot, arcuate shaped hangers secured to the lower flange of said side beams and depending below said top, stringers mounted on the lower ends of said hangers, spaced parallel V-shaped rails positioned on the stringers, a carriage having rail conforming rollers thereon mounted to travel longitudinally of the table and underneath said table top with the rail conforming rollers travelling on said V-shaped rails, a vertically disposed post mounted on said carriage and projecting up through said slot, a radial arm saw mounted on the post above said table top and positioned with the saw adapted to cut materials on the top of the table, a chain trained over sprockets mounted on transversely disposed shafts journalled in said side beams and said chain has one end thereof connected to each end of the carriage, a motor mounted at one end of said table on the outer surface of one end beam and operatively connected to the chain, manually actuated control means associated with the motor, an intermediate platform positioned below the top of the table and intermediate bearings positioned on said platform for supporting said transversely disposed shafts at the center thereof.

References Cited in the file of this patent

UNITED STATES PATENTS

| | | |
|---|---|---|
| 176,531 | Hoffman | Apr. 25, 1896 |
| 566,624 | Sager | Aug. 25, 1896 |
| 757,626 | Kottmann | Apr. 19, 1904 |
| 1,529,303 | Drucker | Mar. 10, 1925 |
| 1,767,012 | Pfau | June 24, 1930 |
| 1,815,037 | De Walt | July 21, 1931 |
| 2,091,450 | Miller | Aug. 31, 1937 |
| 2,323,248 | Sellmeyer | June 29, 1943 |

FOREIGN PATENTS

| | | |
|---|---|---|
| 177,668 | Switzerland | Aug. 16, 1935 |
| 266,439 | Switzerland | Apr. 17, 1950 |